No. 885,629. PATENTED APR. 21, 1908.
M. MARTIN.
FLUID GAGE.
APPLICATION FILED MAY 14, 1906.
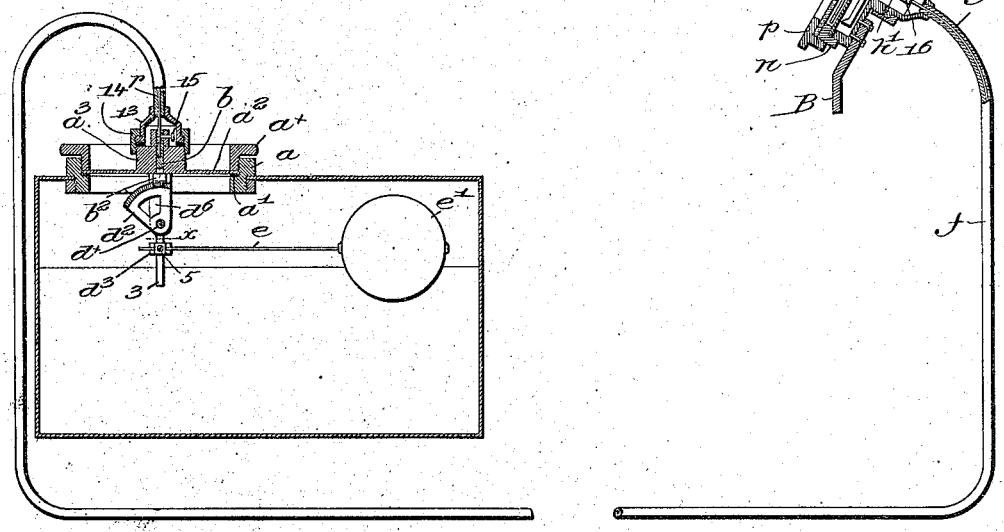
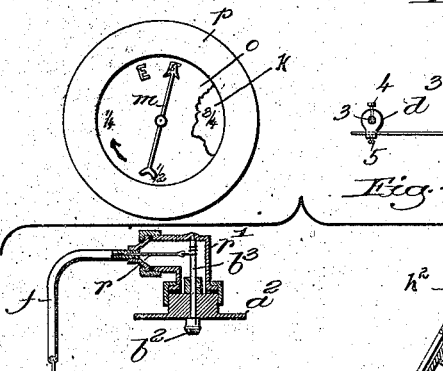
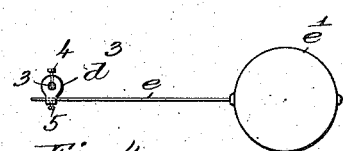
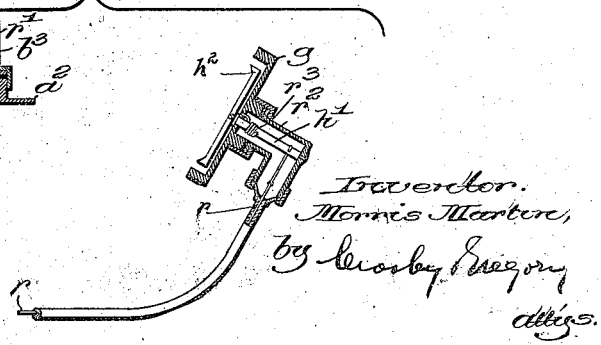

UNITED STATES PATENT OFFICE.

MORRIS MARTIN, OF MALDEN, MASSACHUSETTS, ASSIGNOR TO BOSTON AUTO GAGE COMPANY, OF BOSTON, MASSACHUSETTS, A CORPORATION OF MASSACHUSETTS.

FLUID-GAGE.

No. 885,629.　　　　Specification of Letters Patent.　　　Patented April 21, 1908.

Application filed May 14, 1906. Serial No. 316,649.

*To all whom it may concern:*

Be it known that I, MORRIS MARTIN, a citizen of the United States, and resident of Malden, county of Middlesex, State of Massachusetts, have invented an Improvement in Fluid-Gages, of which the following description, in connection with the accompanying drawings, is a specification, like letters on the drawings representing like parts.

This invention has for its object the production of a novel fluid gage to indicate the depth of a quantity of fluid in a tank.

My novel gage comprises a cap having a bearing for a shaft, provided with a pinion and a float actuated gear to rotate said shaft and turn an indicating needle in a gage head located at a distance from the tank. The actuating gear has a depending portion, on which is an adjustable collar that holds a float sustaining arm, and said arm is adjustable longitudinally in said collar. The shaft having the gear referred to carries a flexible driving member, shown as a wire extended through a pipe connected with a gage head; the opposite end of said wire being connected with a shaft sustained in said head and provided with a magnet. The pipe referred to is connected, air and fluid tight, with a cap located in the tank and with the gage head, in any suitable manner, as by a union joint.

Figure 1 shows in section a tank provided with a gage embodying my invention, the tank being connected by a pipe with the gage head also shown in section. Fig. 2 is a face view of the head: Fig. 3 is a section below the dotted line $x$, Fig. 1; Fig. 4 is a modification to be described.

The tank A, of any suitable material and shape, besides the usual filling opening, will have soldered or connected with it a bushing $a$. The interior of the bushing has a shoulder on which is laid a packing $a'$ on which in turn is laid a plate $a^2$ having a hub $a^3$ provided with a hole to receive a short shaft $b$ to be described. The plate $a^2$ is clamped air tight in the bushing by a screw-threaded ring $a^×$. The shaft $b$ is shown as provided with an enlargement above the hub $a^3$ and bored for part of its length and the lower end of the shaft is provided with a bevel pinion $b^2$, that is engaged by a sector $d^2$ mounted on a shaft $d^×$ sustained in lugs $d^6$ depending from the under side of the plate $a^2$. The sector has a depending arm 3, on which is mounted a collar $d^3$ adapted to be held in any adjusted position on said arm by a set screw 4. The collar has a hole therethrough at right angles to the depending arm that receives the end of an arm $e$ provided with a float $e'$, said arm being adjustable longitudinally in said collar to accommodate tanks of various length, the arm being held in its adjusted position by a set screw 5. In practice, the collar $d^3$ will be adjusted on the depending arm 3 according to the depth of the tank, and the teeth on the sector will compare with the teeth on the bevel gear $b^2$ as 2 to 1.

The gage head is shown as a box $g$ having a hub 10 threaded externally to receive a threaded ring $h$ forming part of a union joint, the inturned flange at the outer end of said ring meeting an outturned flange of a nipple 12, a packing being inserted between the flanged end of the nipple and the end of the head 10, so that when the ring $h$ is screwed down tight, a fluid and air tight joint is made between the nipple and the head. The nipple 12 has secured to it, gas and fluid tight, a tube $f$ that at its opposite end is connected in like manner with a similar nipple 13, the flanged end of which, a suitable packing having been introduced between it and the projection $a^3$, is clamped, gas and fluid tight, to the projection by means of a threaded union 14, in all particulars the same as the union 10.

The hole in the upper end of the short shaft $b$ receives a wire, or flexible member $r$, employed to rotate a shaft $h'$ depending from a magnet $h^2$, one end of said flexible member being connected with shaft $b$ Fig. 1 by a screw 15, while the other end is connected with the shaft $h'$ by a screw 16.

The box $g$ is suitably secured to a portion B, supposed to be part of a dasher of an automobile, or other fixed part, where it is desired to expose the gage head. The open top of the box receives upon it a plate $k$ having a suitable pivot to receive a magnetic pointer $m$, said plate having suitable scale markings or indications, see Fig. 2, over which said pointer is moved by the magnet $h^2$. The under side of the plate rests on a washer, Fig. 1, laid on the circular edge of the box $g$. The plate $k$ is held in adjusted working position with relation to the magnet by a screw ring $n$ that confines the plate to the box, gas and fluid tight. The outer face of the ring $n$ receives a glass cover $o$ that is held in position by a screw ring $p$.

With the tank containing liquid, as shown in Fig. 1, the quantity being that which should ordinarily be indicated full, the pointer *m* will point to F on the dial, see Fig. 2, and as the float descends from the position, Fig. 1, to the bottom of the tank, the sector will turn the shaft *b*, and through the flexible connection uniting said shaft with the shank *h'* of the magnet, will rotate the magnet in the direction of the arrow Fig. 2 once.

The apparatus shown is adapted to be applied to a pressure tank and it is essential that the tube *f* connected with the detachable plate sustaining the float, and the gage-head should be absolutely air tight, or, in other words, the pipe should prevent any air that might get thereinto from the tank from escaping from said pipe.

Instead of using the wire to transmit the motion from the shaft *b* to the shaft *h'*, I may use other flexible connections, for instance, a piece of wire *r* with a piece of fine link chain at each end, chain such as is used in watch movements, or the connection may be entirely of chain, and in such event, the chain will be wound on the upper end of the shaft $b^3$, see Fig. 4, and will be led therefrom through an L-shaped nipple *r'*, to which is connected gas and fluid tight the pipe *f*, the opposite end of the pipe entering a like nipple $r^2$, said chain being connected at its farthest end to the shaft *h'*, from which it may be unwound, for instance, by the movement of the float, turning to the sector $d^6$ the shaft *h'* being moved in an opposite direction by a spring $r^3$ surrounding the same.

The spring $r^3$ surrounding the shaft *h'* may be wound as the chain is being wound on the shaft $b^3$ the float then descending, and as the float rises under the action of fluid, the spring $r^3$ will unwind and turn the magnet and pointer in the direction from empty to full.

Having fully described my invention, what I claim as new and desire to secure by Letters Patent is:

In a fluid gage, a bushing having a shaft and adapted to be connected with a tank, a gage head remote from said tank, a magnet having a shaft and a magnetic needle both sustained in said head, combined with a pipe connecting said bushing and head gas and fluid tight, flexible connections attached at one end to the shank of the magnet, and at its other end to the shaft in said bushing, a float, and means intermediate said float and the shaft in the bushing to rotate said shaft as the float rises and falls due to level of fluid in the tank, the flexible connection rotating the magnet and the latter turning with it the magnetic needle.

In testimony whereof, I have signed my name to this specification, in the presence of two subscribing witnesses.

MORRIS MARTIN.

Witnesses:
 GEO. W. GREGORY,
 ELIZABETH R. MORRISON.